(12) United States Patent
Chang (10) Patent No.: US 11,512,996 B2
(45) Date of Patent: Nov. 29, 2022

(54) FLOW SPEED DETECTION CIRCUIT AND ASSOCIATED CHIP AND FLOW METER

(71) Applicant: SHENZHEN GOODIX TECHNOLOGY CO., LTD., Guangdong (CN)

(72) Inventor: Jung-Yu Chang, Guangdong (CN)

(73) Assignee: SHENZHEN GOODIX TECHNOLOGY CO., LTD., Guangdong (CN)

(*) Notice: Subject to any disclaimer, the term of this patent is extended or adjusted under 35 U.S.C. 154(b) by 157 days.

(21) Appl. No.: 17/028,944

(22) Filed: Sep. 22, 2020

(65) Prior Publication Data
US 2021/0148747 A1    May 20, 2021

Related U.S. Application Data

(63) Continuation of application No. PCT/CN2020/101066, filed on Jul. 9, 2020.

(30) Foreign Application Priority Data

Nov. 15, 2019  (CN) .......................... 201911118353.0

(51) Int. Cl.
    *G01F 23/28*    (2006.01)
    *G01F 3/22*     (2006.01)

(52) U.S. Cl.
    CPC .............. *G01F 23/28* (2013.01); *G01F 3/224* (2013.01)

(58) Field of Classification Search
    CPC ........... G01F 1/667; G01F 23/28; G01F 3/224
    See application file for complete search history.

(56) References Cited

U.S. PATENT DOCUMENTS 3,818,757 A * 6/1974 Brown .................... G01F 1/667
                                                     73/861.28
3,869,915 A * 3/1975 Baumoel .................. G01F 1/66
                                                     73/861.28
(Continued)

FOREIGN PATENT DOCUMENTS

CN          1342262 A    3/2002
CN        104870950 A    8/2015
(Continued)

OTHER PUBLICATIONS

English Abstract of CN109186693B.
(Continued)

*Primary Examiner* — John Fitzgerald
(74) *Attorney, Agent, or Firm* — WPAT, P.C., Intellectual Property Attorneys; Anthony King (57) ABSTRACT

The present application discloses a flow speed detection circuit and a related chip and flow meter. The flow speed detection circuit includes: a transmitter, configured to provide a front signal and a main signal to a first transducer, wherein the first transducer transforms the front signal and the main signal into a transduced signal to a second transducer, the second transducer transforms the transduced signal into a receiving front signal and a receiving main signal to a receiver; and the receiver includes: a front signal detection circuit, configured to enable the main signal processing circuit after the receiving front signal; and the main signal processing circuit, configured to determine the flow speed based on the receiving main signal after being enabled.

18 Claims, 5 Drawing Sheets

(56) References Cited

U.S. PATENT DOCUMENTS

| | | | | |
|---|---|---|---|---|
| 5,831,175 | A | * | 11/1998 | Fletcher-Haynes ..... G01F 1/667 |
| | | | | 73/1.16 |
| 6,119,070 | A | | 9/2000 | Beneteau et al. |
| 7,775,125 | B2 | * | 8/2010 | Rhodes ................... G01F 25/10 |
| | | | | 73/861.27 |
| 10,928,414 | B2 | * | 2/2021 | Hies ........................ G01F 1/667 |
| 11,441,933 | B2 | * | 9/2022 | Chang ........................ G01F 1/66 |
| 2004/0261539 | A1 | * | 12/2004 | Umekage ................ G01F 1/667 |
| | | | | 73/861.27 |
| 2006/0243063 | A1 | | 11/2006 | Bussinger |
| 2013/0167656 | A1 | | 7/2013 | Takemura et al. |
| 2017/0167904 | A1 | * | 6/2017 | Sathyanarayana ...... G01F 1/662 |
| 2018/0335330 | A1 | * | 11/2018 | Gestner ................... G01F 25/17 |
| 2021/0041277 | A1 | * | 2/2021 | Huang ................. G01F 15/024 |
| 2022/0057243 | A1 | * | 2/2022 | Ishida ..................... G01F 1/662 |

FOREIGN PATENT DOCUMENTS

| | | | |
|---|---|---|---|
| CN | 104897219 | A | 9/2015 |
| CN | 105628115 | A | 6/2016 |
| CN | 107024251 | A | 8/2017 |
| CN | 107110961 | A | 8/2017 |
| CN | 107131653 | A | 9/2017 |
| CN | 107131918 | A | 9/2017 |
| CN | 109923783 | A | 6/2019 |
| CN | 110168319 | A | 8/2019 |
| CN | 110987099 | A | 4/2020 |
| CN | 109186693 | B | 5/2020 |
| CN | 110073176 | B | 11/2020 |
| CN | 110291366 | B | 12/2020 |
| JP | H0719916 | B2 | 3/1995 |
| JP | H08128874 | A | 5/1996 |
| JP | 11173880 | A | 7/1999 |
| JP | H11515100 | A | 12/1999 |
| JP | 2007024681 | A | | 2/2007 |
| JP | 2010066083 | | | 3/2010 |
| JP | 2010151583 | A | * | 7/2010 |
| JP | 2010243431 | A | | 10/2010 |
| JP | 2014235108 | A | | 12/2014 |

OTHER PUBLICATIONS

English Abstract of CN110073176B.
English Abstract of CN110291366B.
English Abstract of JP2007024681A.
English Abstract of JPH0719916B2.
English Abstract of JPH08128874A.
English Abstract of JPH11515100A.
Design of Ultrasonic Time Difference Flow Measurement Circuit Based on C8051F500, Jia Huiqin et al., School of Electronic Engineering, Xian University of Petroleum, Xi'an Shaanxi,710065, DOI:10.16520/j.cnki.1000-8519.2019.01.016, (Jan. 2019).
English abstract translation of CN1342262A.
English abstract translation of CN104870950A.
English abstract translation of CN104897219A.
English abstract translation of CN105628115A.
English abstract translation of CN107024251A.
English abstract translation of CN107110961A.
English abstract translation of CN107131653A.
English abstract translation of CN107131918A.
English abstract translation of CN109923783A.
English abstract translation of CN110168319A.
English abstract translation of CN110987099A.
English abstract translation of JP11173880A.
English abstract translation of JP2010243431A.
English abstract translation of JP2014235108A.
English abstract translation of JP2010066083.

* cited by examiner

FLOW SPEED DETECTION CIRCUIT AND ASSOCIATED CHIP AND FLOW METER

CROSS-REFERENCE TO RELATED APPLICATIONS

This application is a continuation of International Application No. PCT/CN2020!101066, filed on Jul. 9, 2020, which claims the priority to China application No. 201911118353.0, filed on Nov. 15, 2019. All of the above-referenced applications are hereby incorporated herein by reference in their entirety.

TECHNICAL FIELD

The present application relates to a determination circuit; in particular, to a flow speed detection circuit and associated chip and flow meter.

BACKGROUND

Ultrasonic flow meters are commonly used flow meters. Flow meters are widely applied in detecting the flow speed of a fluid; compared with other types of flow meters, ultrasonic flow meters have greater advantages in aspects like pressure loss, lowest detectable flow rate and installation cost; however, the power consumption thereof still needs to be reduced, and further improvement and innovation are needed.

SUMMARY OF THE INVENTION

One of the purposes of present application is to disclose a determination circuit; in particular, a flow speed detection circuit and associated chip and flow meter to address the above-mentioned issues.

One embodiment of the present application discloses a flow speed detection circuit, which is coupled to a first transducer and a second transducer that are external to the flow speed detection circuit, wherein a distance between the first transducer and the second transducer is greater than zero, and a fluid having a flow speed sequentially flows through the first transducer and the second transducer. The flow speed detection circuit includes, a transmitter, coupled to the first transducer and configured to provide a front signal and a main signal to the first transducer, wherein the first transducer transforms the front signal and the main signal into a transduced signal to the second transducer, the second transducer transforms the transduced signal into a receiving front signal and a receiving main signal to a receiver; and the receiver, coupled to the second transducer, wherein the receiver includes: a front signal detection circuit, configured to enable the main signal processing circuit after the receiving front signal; and the main signal processing circuit, configured to determine the flow speed based on the receiving main signal after being enabled.

One embodiment of the present application discloses a chip, which includes the above-mentioned flow speed detection circuit.

One embodiment of the present application discloses a flow meter, which includes the above-mentioned chip.

The flow speed detection circuit disclosed in the present application includes a receiver and a transmitter, and is used with a pair of transducers. During operation, one of the pair of transducers serves as the signal receiver and the other as the signal transmitter. The flow speed detection circuit can determine the time point at which the transducer (as the signal receiver) receives the signal. Accordingly, the start time point for enabling the receiver can be adjusted so that the start time point is the same as the time point. Therefore, the receiver does not need to be kept enabled at all times, which can reduce the power consumption of the flow speed detection circuit when determining the flow speed.

DETAILED DESCRIPTION

In the following description, when a device is a rising edge triggered (i.e., active high) device, it means that the device is activated by asserting a signal to let the signal become a logic high level. On the contrary, the device is deactivated by de-asserting the signal to let the signal become a logic low level. However, when a device is a falling edge triggered (i.e., active low) device, it means that the device is activated by de-asserting a signal to let the signal become a logic low level, and the device is deactivated by asserting the signal to let the signal become a logic high level.

Generally, flow meters are used to detect the flow speed of the fluid. The flow meter includes at least a transmitter, a receiver, and a pair of transducers. During operation, one of the pair of transducers serves as the signal receiver and the other as the signal transmitter. The receiver is enabled to measure the flow speed.

To measure the flow speed accurately, one should make sure that the signal received by the receiver is complete; in other words, the signal is not truncated. To accomplish this purpose, one approach is to start enabling the receiver when the transmitter transmits the signal; nonetheless, this approach contradicts the intended purpose of reducing the power consumption. Another approach is to estimate the maximum and minimum values of signal transmission time in advance when designing the circuit. Then, all possible time points at which the signal is transmitted to the transmitter are estimated based on the maximum value and the minimum value. The duration during which the receiver is enabled is designed based on all possible time points, so that the receiver is capable of receiving the complete signal under all circumstances, which is discussed in detail below in comparative embodiments shown in FIG. 1 and FIG. 2. Since this implementation considers all possible time points, when the duration is extended, the power consumption of the flow meter becomes inefficient. Conversely, when the duration is not extended, the power consumption becomes more efficient.

The flow speed detection circuit of the present application estimates the time point at which the signal transmitted by the transmitter reaches the receiver, and hence, it is not necessary to consider all possible time points. In this way, it is not necessary to extend the duration for enabling the receiver, and as a result, the power consumption of the flow speed detection circuit becomes more efficient, which is discussed below in detail in embodiments shown in FIG. 3 and FIG. 4.

Figure 1:
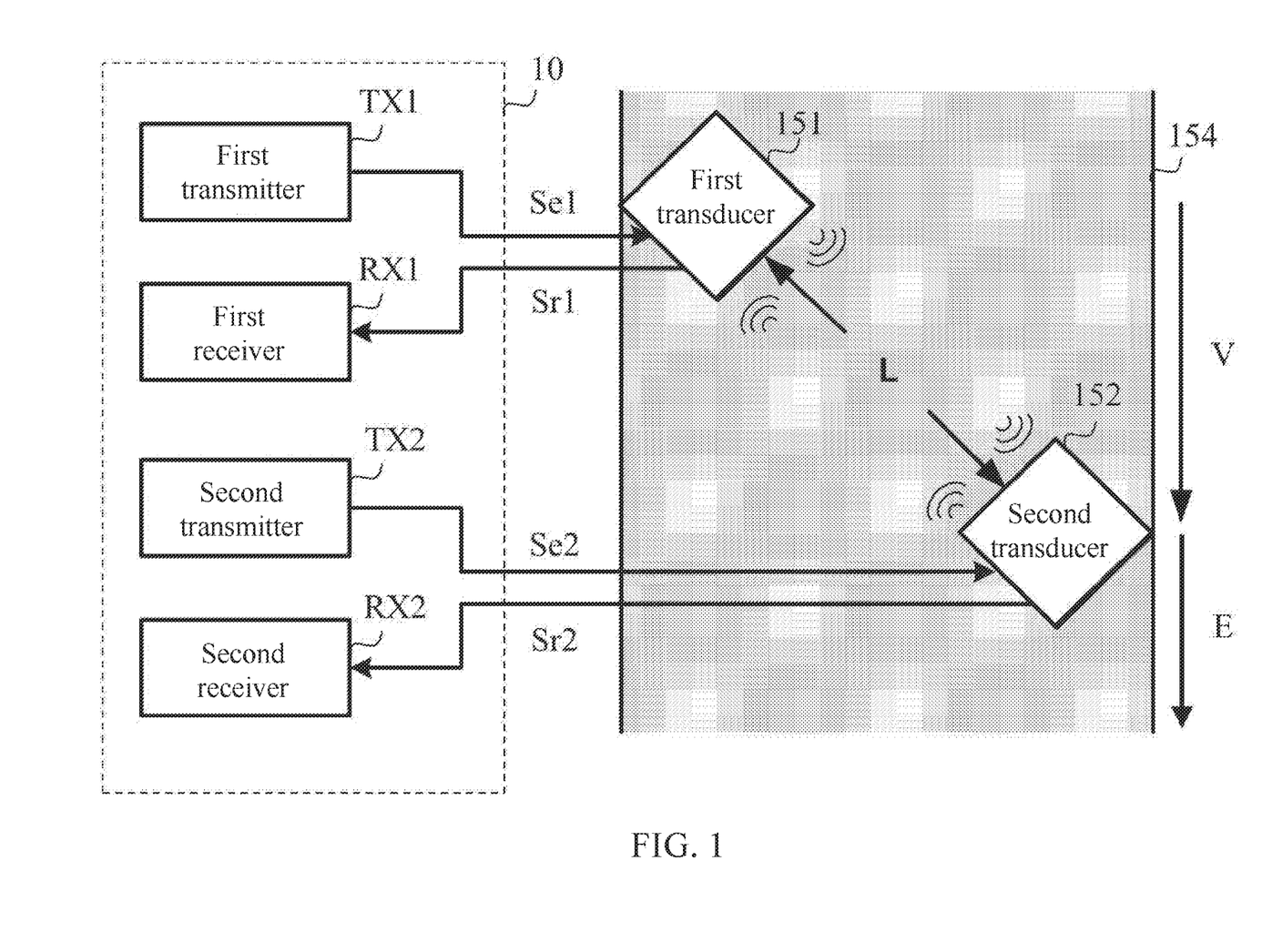
FIG. 1 is a schematic diagram illustrating a flow speed detection circuit applied in a flow meter according to one embodiment of the present application.

FIG. 1 is a schematic diagram illustrating a flow speed detection circuit 10 applied in a flow meter according to one embodiment of the present application. Referring to FIG. 1, the flow speed detection circuit 10 is coupled to a first transducer 151 and a second transducer 152 external to the flow speed detection circuit 10. The transducer is a component capable of transforming the energy in one form into another form. The forms of energy may include, electric energy, mechanical energy, electromagnetic energy, light energy, chemical energy, sound energy thermal energy, etc.; yet the present application is not particularly limited, and the transducer may include any component capable of transforming energy.

The first transducer 151 and the second transducer 152 are arranged in a pipeline 154, wherein the transmission direction of the first transducer 151 faces the second transducer 152, and the transmission direction of the second transducer 152 faces the first transducer 151. The distance L between the first transducer 151 and the second transducer 152 is greater than zero. A fluid (e.g., liquid or gas) having a flow speed V flows in an extension direction E of the pipeline 116 through the first transducer 151 and the second transducer 152, sequentially.

The flow speed detection circuit 10 includes a first transmitter TX1, a first receiver RX1, a second transmitter TX2, and a second receiver RX2. The first transmitter TX1 and the first receiver RX1 are coupled to the first transducer 151, and the second transmitter TX2 and the second receiver RX2 are coupled to the second transducer 152.

During the operation for estimating the flow speed V, in the first signal transmission pathway, the first transmitter TX1 transmits a first transmit signal Se1 to the first transducer 151, and the first transducer 151 transforms the first transmit signal Se1 into a transduced signal and then transmits the transduced signal to transmit second transducer 152. After the second transducer 152 transforms the transduced signal once again, the second receiver RX2 receives a second receiving signal Sr2 from the second transducer 152. In the second signal transmission pathway, the second transmitter TX2 serves as the start point of the second signal transmission pathway, whereas the first receiver RX1 serves as the endpoint of the second signal transmission pathway, wherein this signal transmission procedure is similar to the signal transmission procedure of the first signal transmission pathway, and hence, a detailed description thereof is omitted herein.

It should be noted that there is a transmission delay between the flow speed detection circuit 10 and the first transducer 151 or the second transducer 152. The delay time caused by the transmission delay may be determined during the stage of circuit design and be used in estimating the flow speed V. However, in the following description of the present application, the delay time is not considered to facilitate the discussion. Hence, the transmit time point of the first transmitter TX1 is considered as the transmit time point of the first transducer 151; the receiving time point of the second transducer 152 is considered as the receiving time point of the second receiver RX2; the transmit time point of the second transmitter TX2 is considered as the transmit time point of the second transducer 152, and the receiving time point of the first transducer 151 is considered as the receiving time point of the first receiver RX1.

Figure 2:
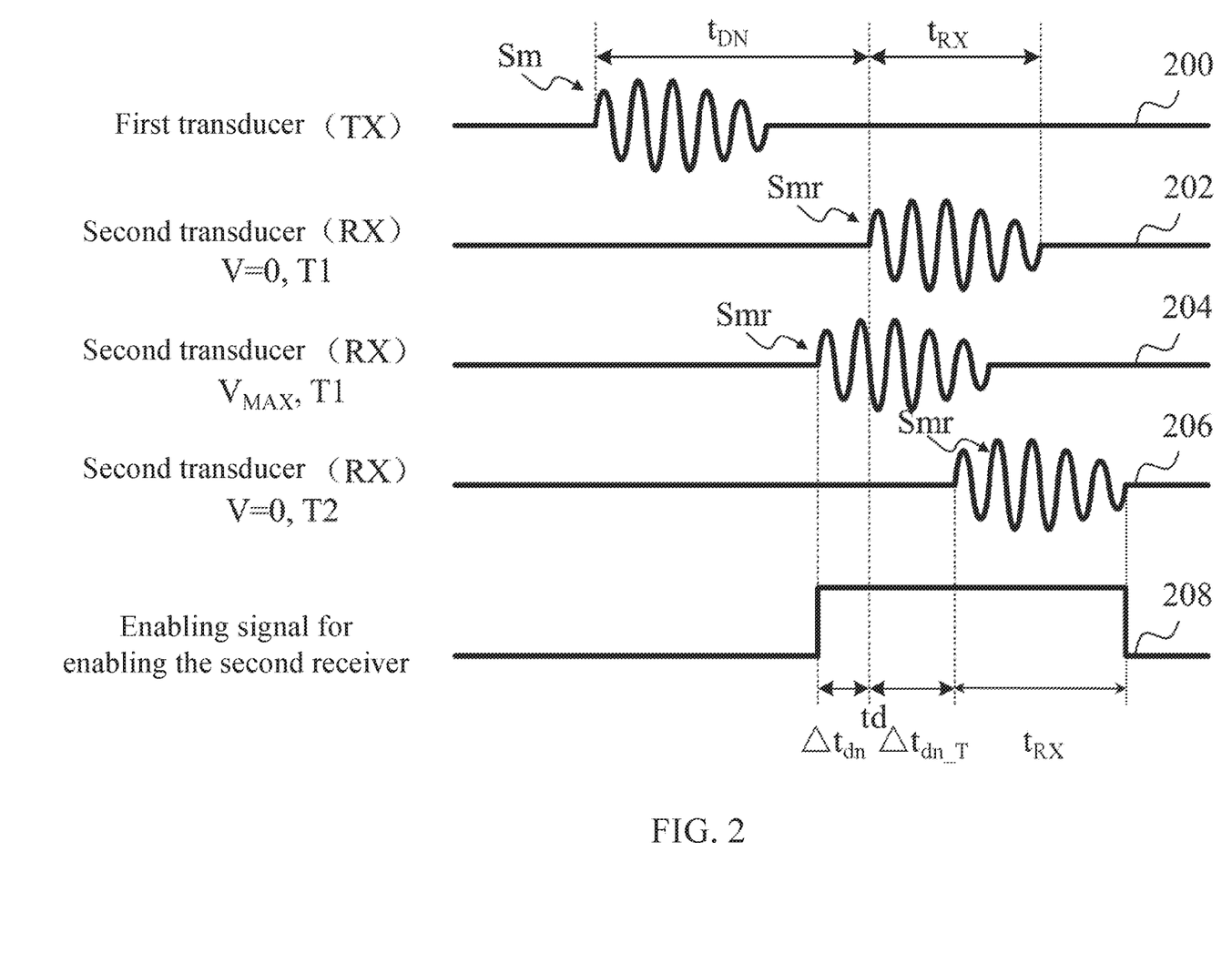
FIG. 2 is a schematic diagram showing the voltage waveform of the flow speed detection circuit shown in FIG. 1 in a time domain.

The operation principle of the flow speed detection circuit 10 is discussed in the embodiment shown in FIG. 2. Further, only the operation principle of the flow speed detection circuit 10 related to the first signal transmission pathway is discussed in FIG. 2 for the sake of brevity.

FIG. 2 is a schematic diagram illustrating the voltage waveform of the flow speed detection circuit 10 of FIG. 1 in a time domain. As discussed above, because only the first signal transmission pathway is discussed in FIG. 2, the first transducer 151 is the signal transmitter, and the second transducer 152 is the signal receiver. Accordingly, the first transducer (TX) and second transducer (RX) are illustrated in FIG. 2 to facilitate the discussion.

Referring to FIG. 2, which shows the waveforms 200, 202, 204, 206, and 208. The waveform 200 represents the voltage waveform of the signal transmitted by the first transducer 151, wherein the signal includes a main signal Sm. The waveforms 202, 204, and 206 represent the voltage waveform of the signal received by the second transducer 152 under various known operation environments, wherein the signal of each of the waveforms 202, 204, and 206 includes a receiving main signal Smr, corresponding to the main signal Sm, wherein, the duration of the receiving main signal Smr is tRX, the delay times between the receiving main signal Smr of each of the waveforms 202, 204, and 206 and the main signal Sm are different. The waveform 208 represents the voltage waveform of the signal configured to enable the second receiver RX2, wherein the second receiver RX2 is enabled when the signal has a high voltage (logic high level).

Referring to waveform 202, under this operation environment, the flow speed V is zero and the temperature is T1, wherein the temperature T1 is, for example, the highest temperature of the operating range of the flow meter. Since the flow speed V is zero, the signal transmission time of the signal in the fluid does not increase or decrease because of the flow speed V. Further, the signal transmission time positively correlates with the temperature of the fluid serving as the transmission medium of the signal. Since the temperature T1 is the highest temperature, the signal transmission time does not increase because of the temperature T1. This operation environment is considered as a standard operating environment, and the signal transmission time between the first transducer 151 and the second transducer 152 under the standard operating environment is also the time difference between the main signal Sm of the waveform 200 and the receiving main signal Smr of the waveform 202, wherein the time difference may be considered as a reference time difference $t_{DN}$. Additionally, the receiving main signal Smr reaches the second receiver RX2 at a time point td. To allow the second receiver RX2 to receive the receiving main signal Smr, referring to waveform 208, the rising edge of the enabling signal for enabling the second receiver RX2 appears at the time point td. The reference time difference $t_{DN}$ and the time point td can be estimated during the stage of circuit design.

Referring to waveform 204, under this operation environment, the flow speed V is the maximum value (labeled as $V_{MAX}$) and the temperature is T1. The signal transmission time of the signal in the fluid having the flow speed $V_{MAX}$ is shorter than the signal transmission time in the fluid having the flow speed V of zero. As could be seen by comparing the waveforms 202 and 204, the receiving main signal Smr of the waveform 204 reaches the second transducer 152 earlier than the main signal Sm of the waveform 202 does. That is, it is earlier than the time point td by a first time difference $\Delta t_{dn}$. The signal transmission time under this operation environment can be considered as the shortest signal transmission time. To allow the second receiver RX2 to receive the receiving main signal Smr, referring to waveform 208, the rising edge of the enabling signal for enabling second receiver RX2 appears at the time point (td−$\Delta t_{dn}$). The first time difference $\Delta t_{dn}$ can be estimated during the stage of circuit design.

Referring to waveform 206, under this operation environment, the flow speed V is zero and the temperature is T2, wherein the temperature T2 is lower than the temperature T1. Since the temperature T2 is lower than the temperature T1, the signal transmission time of the signal under the temperature T2 is longer than the signal transmission time under the temperature T1. As could be seen by comparing the waveforms 202 and 206, the receiving main signal Smr of the waveform 206 reaches the second transducer 152 later than the main signal Sm of the waveform 202 does. That is, it is later than the time point td by a second time difference $\Delta t_{dn\_T}$. The signal transmission time under this operation environment can be considered as the longest signal transmission time. To allow the second receiver RX2 to receive the receiving main signal Smr, referring to waveform 208, the rising edge of the enabling signal for enabling the second receiver RX2 appears at the time point (td+$\Delta t_{dn\_T}$). The second time difference $\Delta t_{dn\_T}$ can be estimated during the stage of circuit design.

When the operating environment only includes the two variables, the temperature and flow speed, the waveforms 204 and 206 respectively represent the earliest extreme situation and the latest extreme situation. Under the standard operating environment, the duration of the signal for enabling the second receiver RX2 is configured to be the same as the duration, $t_{RX}$, of the receiving main signal Smr; in this way, the second receiver RX2 is capable of receiving the complete receiving main signal Smr. However, considering that the actual operation environment may be the same as the operating environment for the waveform 204, the second receiver RX2 should be enabled for extra duration, i.e., the first time difference $\Delta t_{dn}$, to make sure that the second receiver RX2 can receive the complete receiving main signal Smr. Similarly, considering that the actual operation environment might be the same as the operating environment for the waveform 206, the second receiver RX2 should be enabled for extra duration, i.e., the second time difference $\Delta t_{dn\_T}$, to make sure that the second receiver RX2 can receive the complete receiving main signal Smr.

In general, to ensure that the second receiver RX2 receives the complete receiving main signal Smr, the total duration that the second receiver RX2 should be enabled is the sum of the durations of tRX, the first time difference $\Delta t_{dn}$, and the second time difference $\Delta t_{d\_T}$. The total duration is longer than the duration of the main signal Sm. When a signal having the total duration is used to enable the second receiver RX2, it might occur that the second receiver RX2 has been enabled yet the main signal Sm has not reached the second receiver RX2. Hence, the power consumption is inefficient.

Figure 3:
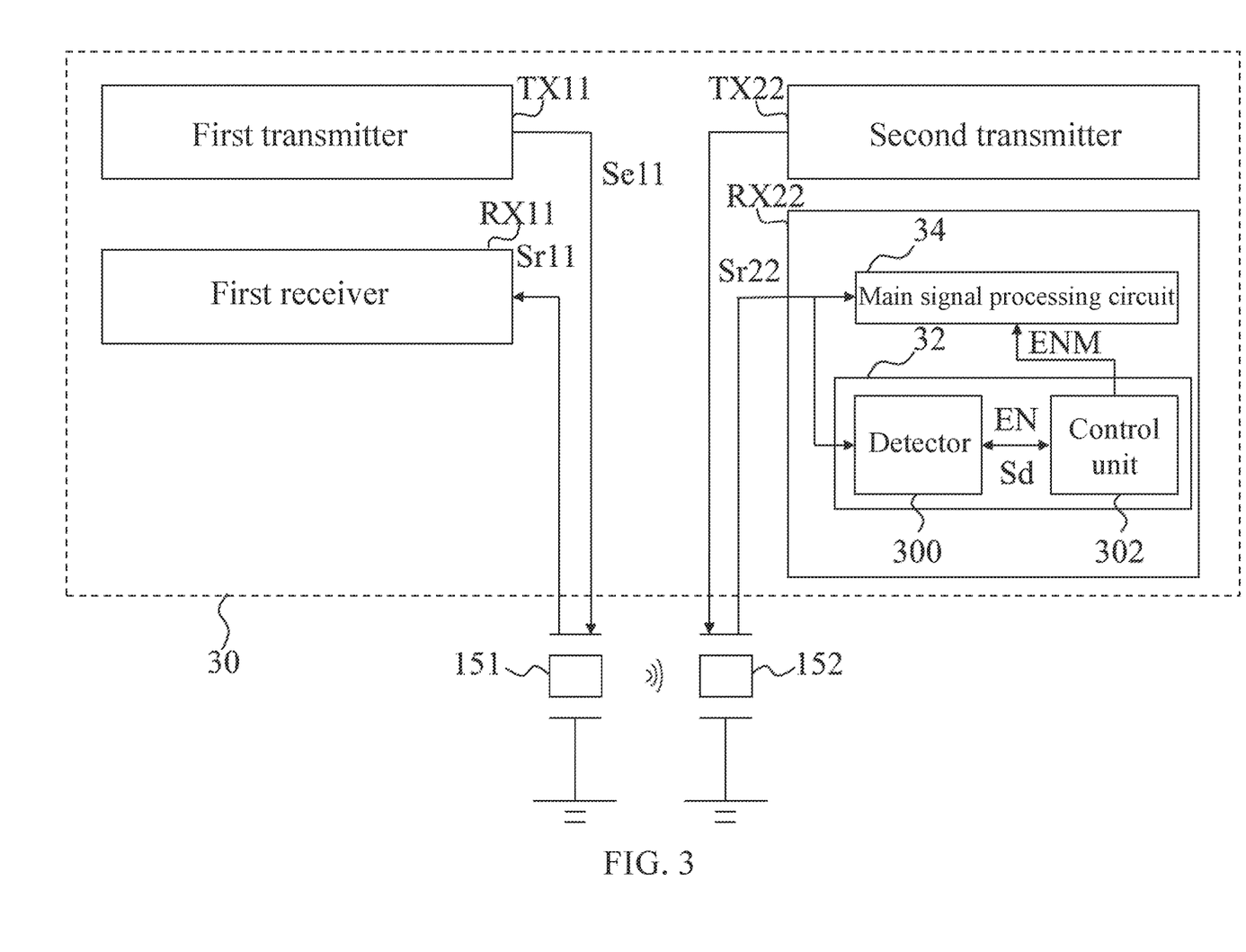
FIG. 3 is a block diagram illustrating a flow speed detection circuit according to another embodiment of the present application.

FIG. 3 is a schematic block diagram illustrating another flow speed detection circuit 30 according to the embodiment of the present application. Referring to FIG. 3, the flow speed detection circuit 30 is similar to the flow speed detection circuit 10 shown in FIG. 1, except that the flow speed detection circuit 30 includes a first transmitter TX11, a first receiver RX11, a second transmitter TX22, and a second receiver RX22. The first transmitter TX11 and the first receiver RX11 are coupled to a first transducer 151, and a second transmitter TX22 and the second receiver RX22 are coupled to a second transducer 152.

When determining the flow speed V, the first transmitter TX11 transmits a first transmit signal Se11 to the first transducer 151 in the first signal transmission pathway. The first transmit signal Se11 includes a front signal and a main signal. The first transducer 151 transforms the first transmit signal Se11 into a transduced signal and then transmits the transduced signal to the second transducer 152. After the second transducer 152 transforms the transduced signal into a second receiving signal Sr22, the second receiver RX22 receives a second receiving signal Sr22 from the second transducer 152. The second receiving signal Sr22 includes a receiving front signal and a receiving main signal. In the second signal transmission pathway, the second transmitter TX22 serves as a starting point of the second signal transmission pathway, whereas the first receiver RX11 serves as an endpoint of the second signal transmission pathway, wherein this signal transmission procedure is similar to the signal transmission procedure of the first signal transmission pathway, and hence, a detailed description thereof is omitted herein.

Figure 4:
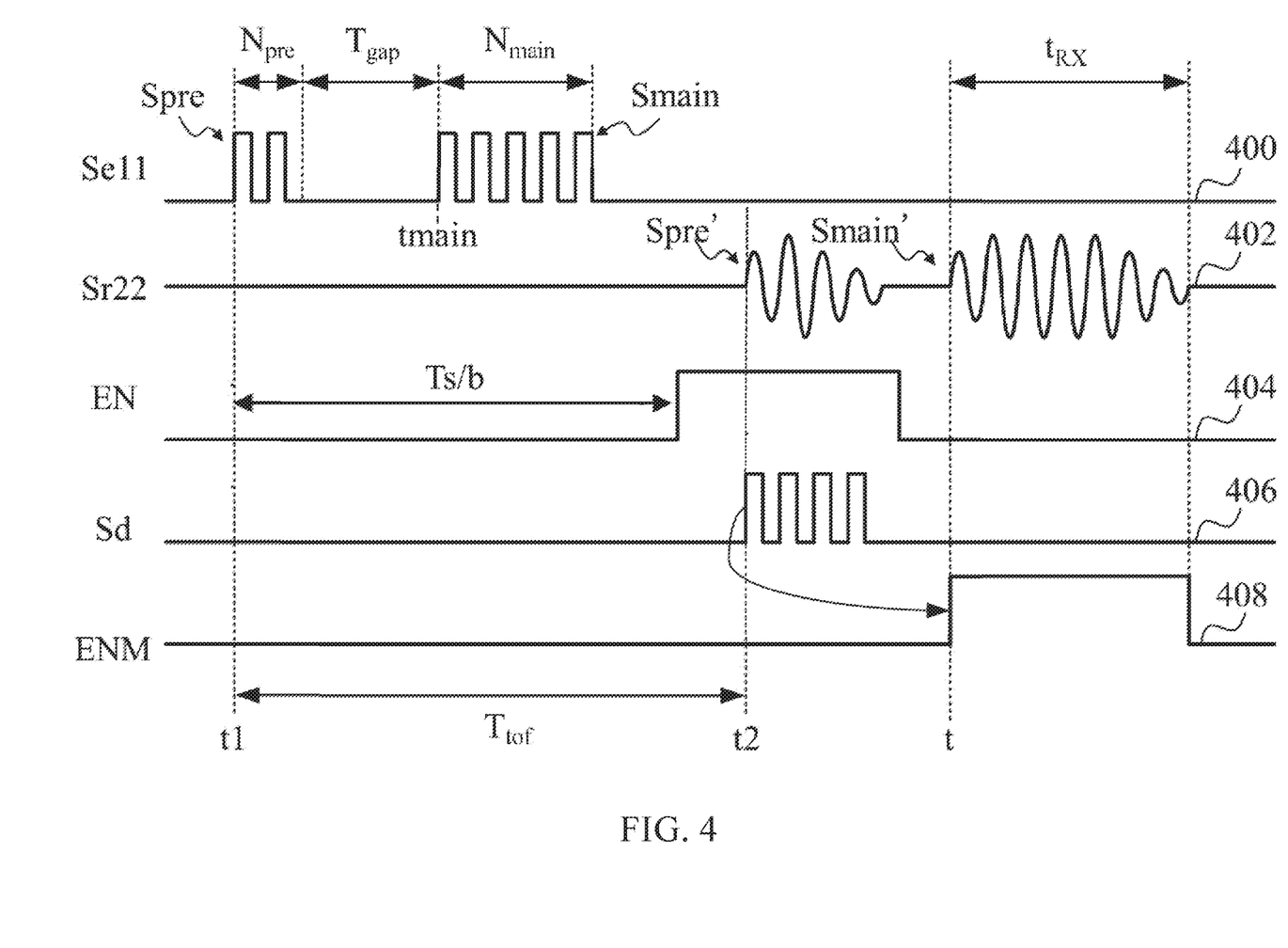
FIG. 4 is a schematic diagram showing the voltage waveform of the flow speed detection circuit shown in FIG. 3 in a time domain.

According to reasons the same as those described above in connection with the embodiments shown in FIG. 1 and FIG. 2, in the embodiments shown in FIG. 3 and FIG. 4, the delay time caused by the transmission delay takes place between the flow speed detection circuit 30 and the first transducer 151 or the second transducer 152 is not considered to facilitate the discussion.

The second receiver RX22 includes a front signal detection circuit 32 and a main signal processing circuit 34. The main signal processing circuit 34 may be considered to have the same functionality of the second receiver RX2 shown in FIG. 1. Hence, the second receiver RX22 may be considered as a combination of the second receiver RX2 shown in FIG. 1 and the additional front signal detection circuit 32.

The front signal detection circuit 32 is configured to enable the main signal processing circuit 34 after receiving the front signal. That is, the start time point for enabling the main signal processing circuit 34 is determined by the front signal detection circuit 32, instead of the shortest signal transmission time and the longest signal transmission time discussed in the embodiment of FIG. 1, see, the embodiment with respect to FIG. 4 for details. Hence, the duration for enabling the main signal processing circuit 34 does not need to include a first time difference $\Delta t_{dn}$ and a second time difference $\Delta t_{dn\_T}$. That is, the duration for enabling the main signal processing circuit 34 is shorter than the total duration for enabling the second receiver RX2 (the total duration is the sum of the duration $t_{RX}$, the first time difference $\Delta t_{dn}$, and the second time difference $\Delta t_{dn\_T}$). Therefore, the power consumption of the flow speed detection circuit 30 is more efficient than the power consumption of the flow speed detection circuit 10 in FIG. 1.

After being enabled, the main signal processing circuit 34 determines the flow speed V based on the receiving main signal. In some embodiments, the main signal processing circuit 34 includes an analog front-end circuit, an analog-to-digital converter, and a determination circuit. The analog front-end circuit is configured to receive the main signal and to output an analog signal to the analog-to-digital converter accordingly. The analog-to-digital converter converts the analog signal into a digital signal, and then outputs the digital signal to the determination circuit, wherein the determination circuit determines the flow speed V based on the digital signal.

The functional blocks of the front signal detection circuit 32 are further discussed below. It should be noted that the present disclosure does not limit the front signal detection circuit 32 to the implementation of the functional blocks discussed below. In the present embodiment, the front signal detection circuit 32 includes a detector 300 and a control unit 302.

The detector 300 is coupled to the second transducer 152, and configured to detect a receiving front signal and outputs an output signal Sd to the control unit 302 based on the detection result. In the present embodiment, the detector 300 is a pulse detector. However, the present disclosure is not limited thereto. In other embodiments, the detector 300 may be equipped with a corresponding detector depending on the type of the signal to be detected. In some embodiments, the detector 300 includes a comparator. The comparator determines whether a receiving front signal is detected by comparing the receiving front signal and the reference signal.

The control unit 302 is coupled between a detector 300 and a main signal processing circuit 34 and is configured to output an enabling signal EN to the detector 300, so that when the enabling signal EN is asserted, the detector 300 is enabled. Further, the control unit 302 receives the output signal Sd of the detector 300 and outputs the enabling signal ENM to the main signal processing circuit 34. More specifically, the control unit 302 determines the time point to assert the enabling signal ENM based on the detection result reflected in the output signal Sd. In some embodiments, the control unit 302 includes a combinatorial logic. The working mechanisms of the detector 300 and the control unit 302 are discussed in detail in FIG. 4.

FIG. 4 is a schematic diagram illustrating the related voltage waveform of the flow speed detection circuit 30 shown in FIG. 3 in a time domain. Referring to FIG. 4, which shows waveforms 400, 402, 404, 406, and 408. The waveform 400 represents the voltage waveform of the first transmit signal Se11 transmitted by the first transmitter TX11, wherein the first transmit signal Se11 includes a main signal Smain and a front signal $S_{pre}$, wherein the main signal Smain has a duration Nmain, and the front signal $S_{pre}$ has a duration Npre. Specifically, after the first transmitter TX11 transmits the front signal $S_{pre}$ at the first time point t1, it goes through a decay time having at least a duration $T_{gap}$ and then transmits the main signal Smain once again. The decay time is intended to make sure that when the front signal $S_{pre}$ decays, the additional vibration portion of the decayed front signal $S_{pre}$ does not affect the main signal Smain. In the present embodiment, the main signal Smain and the front signal $S_{pre}$ are both pulse signals, wherein the pulse signal includes at least one pulse. However, the present disclosure is not limited thereto. In other embodiments, the main signal Smain and the front signal $S_{pre}$ may be any other suitable type of signal.

The waveform 402 represents the voltage waveform of the second receiving signal Sr22 received by the second receiver RX22. The second receiving signal Sr22 includes a receiving front signal $S_{pre}$' and a receiving main signal Smain'. As could be seen from the waveform 402, the receiving front signal $S_{pre}$' has decayed, and the decayed receiving front signal $S_{pre}$' has an additional vibration portion. The additional vibration portion of the decayed receiving front signal $S_{pre}$' does not affect the receiving main signal Smain' because of the existence of the decay time.

It should be noted that according to the same reason described above in connection with the waveform 202 shown in FIG. 2, during the stage of circuit design, it is feasible to determine the signal transmission time of the signal in the fluid, and the respective standard time point at which the receiving main signal Smain' and the receiving front signal $S_{pre}$' arrive at the second receiver RX22, under the standard operating environment. To facilitate the discussion, under the standard operating environment, both the signal transmission time in FIG. 4 and the signal transmission time in FIG. 2 are the reference time difference $t_{DN}$.

The waveform 404 represents the voltage waveform of the enabling signal EN outputted by the control unit 302, wherein the detector 300 is enabled when the enabling signal EN is at the high voltage level. The waveform 406 represents the voltage waveform of the output signal Sd outputted by the detector 300. The waveform 408 represents the voltage waveform of the enabling signal ENM outputted by the control unit 302, wherein the main signal circuit 34 is enabled when the enabling signal ENM is at the high voltage level.

During operation, referring to the waveform 400, the first transmitter TX11 provides a front signal Spre at a first time point t1, and then after a decay time, it transmits a main signal Smain to the first transducer 151 at a time point tmain. After the transmission between the first transducer 151 and the second transducer 152, referring to the waveform 402, the second transducer 152 outputs a receiving front signal Spre' and a receiving main signal Smain'. It should be noted that the duration of the receiving front signal Spre' and the duration of the receiving main signal Smain' are $t_{RX}$, which can be determined during the stage of circuit design. Referring to the waveform 404, the rising edge of the enabling signal EN outputted by the control unit 302 appears after a standby time having a duration of Ts/b starting from the first time point t1. In other words, the detector 300 is enabled after it goes through the standby time having the duration of Ts/b starting from the first time point t1, rather than being enabled at the first time point t1. In this way, the efficiency of the power consumption of the front signal detection circuit 32 may be further improved. However, the present disclosure is not limited thereto. In other embodiments, the enable detector 300 may be enabled starting from the first time point t1.

Next, the detector 300 detects the receiving front signal Spre' at a second time point t2. Specifically, the time point at which the detector 300 detects the first pulse of the second receiving signal Sr22 is the second time point t2. Therefore, referring to waveform 406, the output signal Sd outputted by the detector 300 starts to change at the second time point t2. The control unit 302 estimates that the receiving front signal Spre' reaches the second receiver RX22 at the second time point t2 based on the output signal Sd.

The control unit 302 determines a time adjustment value based on the first time point t1 and the second time point t2, and then enables the main signal processing circuit 34 based on the time adjustment value. Specifically, the control unit 302 estimates an estimated time difference $T_{tof}$ between the first time point t1 and the second time point t2, wherein the estimated time difference $T_{tof}$ is the signal transmission time of the signal in the fluid during the operation for estimating the flow speed V. It should be noted that although the estimated time difference $T_{tof}$ is obtained by estimating the front signal Spre rather than the main signal Smain, during the operation for estimating the flow speed V, the signal transmission times of the signal in the fluid for the front signal Spre and the main signal Smain are the same.

The control unit 302 determines a time adjustment value according to the estimated time difference $T_{tof}$ and the reference time difference $t_{DN}$. Specifically, the difference between the estimated time difference $T_{tof}$ and the reference time difference $t_{DN}$ indicates the difference between the signal transmission time during the operation for estimating the flow speed V and the signal transmission time under the standard operating environment. The difference, therefore, represents the time amount by which the time point at which the receiving main signal Smain' reaches the second receiver RX22 during the operation for estimating the flow speed V is earlier or later than the standard arrival time point of the receiving main signal Smain' under the standard operating environment. Therefore, the difference is considered as the time adjustment value. The control unit 302 can then estimate the time point at which the receiving main signal Smain' reaches the second receiver RX22 during the operation for estimating the flow speed V based on the standard arrival time point and the time adjustment value. Next, the control unit 302 adjusts the start time point t for enabling the main signal processing circuit 34 so that the start time point t is the same as the estimated time point that the signal reaches the second receiver RX22. In other words, referring to waveform 208, the control unit 302 raises the enabling signal ENM to the rising edge at the estimated time point that the signal reaches the second receiver RX22.

Since the time point at which the receiving main signal Smain' reaches the second receiver RX22 can be estimated on-line, the duration for enabling the main signal processing circuit 34 may be fixed as the duration $t_{RX}$ of the receiving main signal Smain', without further considering the first time difference $\Delta t_{dn}$ and second time difference $\Delta t_{dn\_T}$. In short, the duration for enabling the main signal processing circuit 34 is the same as the duration $t_{RX}$ of the receiving main signal Smain'. Therefore, the duration for enabling the main signal processing circuit 34 is shorter than the total duration during which the second receiver RX2 shown in FIG. 1 is enabled (the sum of the duration $t_{RX}$, the first time difference $\Delta t_{dn}$, and the second time difference $\Delta t_{dn\_T}$).

The second receiver RX22, compared with the second receiver RX2 shown in FIG. 1, further includes the front signal detection circuit 32. However, since the duration for enabling the main signal processing circuit 34 is shortened, and the reduction of power consumption due to such shortened duration is greater than the power consumption from the front signal detection circuit 32. Moreover, since the front signal detection circuit 32 is not used to determine the flow speed, the circuit structure of the front signal detection circuit 32 is relatively simple, and hence, the power consumption caused by the front signal detection circuit 32 may be neglected. Therefore, the power consumption of the flow speed detection circuit 30 shown in FIG. 3 is lower than the power consumption of the flow speed detection circuit 10 shown in FIG. 1.

Returning back to the waveform 404, it should be noted that the design of the standby time Ts/b also takes into account the above-mentioned shortest signal transmission time and the above-mentioned longest signal transmission time. In general, when the physical parameter of the fluid is a first value, it takes a first flow time for the fluid to flow from the first transducer 151 to the second transducer 152. When the physical parameter of the fluid is a second value, it takes a second flow time for the fluid to flow from the first transducer 151 to the second transducer 152, wherein the second value is different from the first value, and the first flow time is shorter than the second flow time. The first flow time is the above-mentioned shortest signal transmission time, and the second flow time is the above-mentioned longest signal transmission time. In some embodiments, the physical parameter includes the temperature of the fluid or the flow speed V of the fluid. In some embodiments, the physical parameter includes the combination of the temperature of the fluid or the flow speed V of the fluid.

further, to ensure that the pulse detected by the detector 300 is the first one of the pulses of the pulse signal, the standby time Ts/b is designed to be shorter than the shortest time required for the fluid to flow from the first transducer 151 to the second transducer 152 (i.e., the above-mentioned shortest transmission time). In other words, the detector 300 is not kept at the enabled state at all times. Hence, the power consumption of the flow speed detection circuit 30 shown in FIG. 3 of the present disclosure is efficient. However, the present disclosure is not limited thereto. In other embodiments, the detector 300 can be kept enabled at all times. As discussed above, the power consumption of the front signal detection circuit 32 may be neglected, it is because that the front signal detection circuit 32 of the detector 300 is used only for detecting signals, instead of determining the flow speed. Therefore, the circuit structure of the detector 300 is relatively simple, and hence, has a low power consumption. Even though the detector 300 is kept at the enabled state at all times, the power consumption of the flow speed detection circuit 30 shown in FIG. 3 is still lower than the power consumption of the flow speed detection circuit 10 shown in FIG. 1.

Moreover, to further decrease the power consumption, when the control unit 302 enables the main signal processing circuit 34, the control unit 302 disables the front signal detection circuit 32. In some embodiments, after the detector 300 detects the first one of the pulses of the receiving front signal Spre' and controls the control unit 302 to enable the main signal processing circuit 34, the control unit can then disable the detector 300. Alternatively, in some embodiments, it is intended to detect all pulses of the receiving front signal Spre'. Therefore, the control unit further determines the end time point of the duration for enabling the detector 300. Specifically, the control unit 302 determines the end time point of the duration for enabling the detector 300 based on the longest time required for the fluid to flow from the first transducer 151 to the second transducer 152 (i.e., the above-mentioned longest transmission time).

Figure 5:
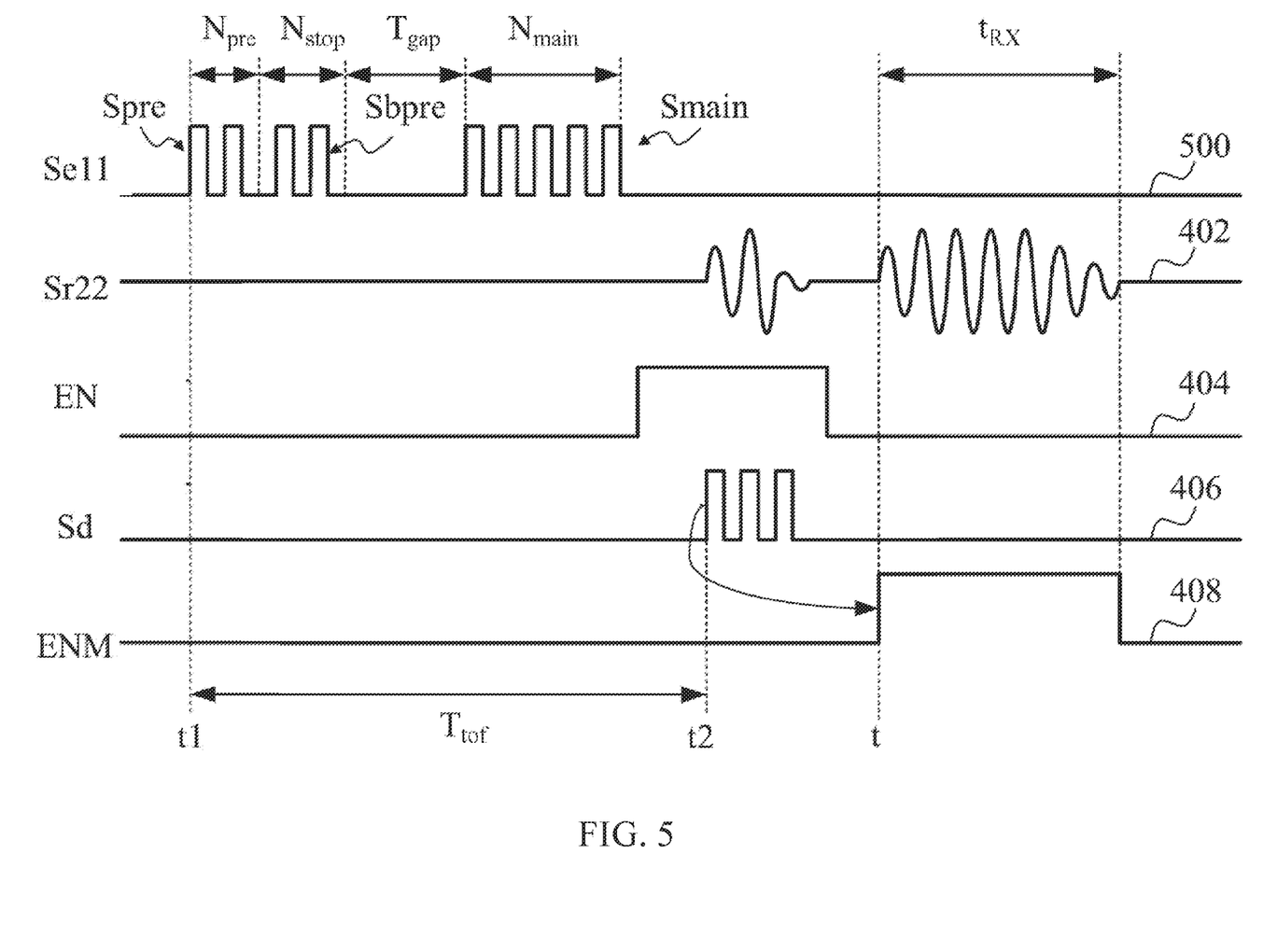
FIG. 5 is a schematic diagram showing the voltage waveform of a flow speed detection circuit according to another embodiment of the present application in a time domain.

FIG. 5 is a schematic diagram illustrating the voltage waveform of a flow speed detection circuit in a time domain according to another embodiment. Referring to FIG. 5, wherein the voltage waveform diagram in FIG. 5 is similar to the voltage waveform diagram in FIG. 4, except that the voltage waveform diagram in FIG. 5 includes a waveform 500. Referring to the waveform 500, the first transmitter TX11 sequentially transmits a front signal Spre and a reversed front signal Sbpre, and then transmits a main signal Smain after a decay time, wherein the front signal Spre and the reversed front signal Sbpre have opposite phases. The additional reversed front signal Sbpre helps eliminate the additional vibration portion of the front signal Spre. Eliminating the additional vibration portion of the front signal Spre helps to reduce the influence on the main signal Smain. In short, it may reduce the time required for the value of the receiving front signal Spre' serving as the preamble signal becomes zero. In this way, the duration of the decay time may be further reduced, so that the work time of the first transmitter TX11 is reduced. As a result, the power consumption of the flow speed detection circuit 30 may be further reduced.

In contrast, in some comparative embodiments, after the first transmitter TX11 transmits the front signal Spre, it transmits the main signal Smain immediately. If the quality factor of the first transducer 151 (or the second transducer 152) is very high, it takes more time for the receiving front signal Spre' serving as the preamble signal to decay to an extent that the receiving main signal Smain' is not affected. To avoid such negative situation, the duration $T_{gap}$ should be increased, thereby causing additional power consumption.

In some embodiments, a chip includes the flow speed detection circuit 30, for example, the chip may be semiconductor chip implemented using a different process.

What is claimed is:

1. A flow speed detection circuit, coupled to a first transducer and a second transducer that are external to the flow speed detection circuit, wherein a distance between the first transducer and the second transducer is greater than zero, and a fluid having a flow speed sequentially flows past the first transducer and the second transducer, wherein the flow speed detection circuit comprises:
   a transmitter, coupled to the first transducer, and configured to provide a front signal and a main signal to the first transducer, wherein the first transducer transforms the front signal and the main signal into a transduced signal to the second transducer, and the second transducer transforms the transduced signal into a receiving front signal and a receiving main signal to a receiver; and
   the receiver, coupled to the second transducer, wherein the receiver comprises:
      a front signal detection circuit, configured to enable a main signal processing circuit after receiving the receiving front signal; and
      the main signal processing circuit, configured to determine the flow speed based on the receiving main signal after being enabled.

2. The flow speed detection circuit of claim 1, wherein a duration during which the main signal processing circuit is enabled is as long as a duration of the receiving main signal.

3. The flow speed detection circuit of claim 1, wherein after the transmitter transmits the front signal, the main signal is transmitted when a decay time of at least a length of time have elapsed.

4. The flow speed detection circuit of claim 3, wherein the transmitter sequentially transmits the front signal and a reversed front signal and then transmits the main signal after the decay time have elapsed.

5. The flow speed detection circuit of claim 4, wherein the front signal and the reversed front signal have opposite phases.

6. The flow speed detection circuit of claim 1, wherein the transmitter provides the front signal at a first time point, and the front signal detection circuit comprises:
   a detector, coupled to the second transducer, wherein the detector detects the receiving front signal at a second time point; and
   a control unit, coupled between the detector and the main signal processing circuit, and configured to determine a time adjustment value based on the first time point and the second time point and enable the main signal processing circuit based on the time adjustment value.

7. The flow speed detection circuit of claim 6, wherein when the detector operates, the detector has a first power consumption, and when the main signal processing circuit operates, the main signal processing circuit has a second power consumption, wherein the second power consumption is greater than the first power consumption.

8. The flow speed detection circuit of claim 6, wherein the front signal is a pulse signal, wherein the pulse signal includes at least one pulse, and the detector is a pulse detector, wherein a time point at which the pulse detector detects the first pulse of the pulse signal is the second time point.

9. The flow speed detection circuit of claim 6, wherein when the control unit enables the main signal processing circuit, the control unit disables the detector.

10. The flow speed detection circuit of claim 6, wherein the detector is not enabled until a standby time has elapsed from the first time point.

11. The flow speed detection circuit of claim 10,
   wherein when a physical parameter of the fluid is a first value, it takes a first flow time for the fluid to flow from the first transducer to the second transducer,
   wherein when the physical parameter of the fluid is a second value, it takes a second flow time for the fluid to flow from the first transducer to the second transducer, wherein the second value is different from the first value, and the first flow time is shorter than the second flow time, and
   wherein the standby time is shorter than the first flow time.

12. The flow speed detection circuit of claim 11, wherein the control unit determines an end time point of enablement of the detector based on the second flow time.

13. The flow speed detection circuit of claim 12, wherein the physical parameter includes temperature of the fluid or the flow speed of the fluid.

14. The flow speed detection circuit of claim 6, wherein the control unit adjusts a start time point of enablement of the main signal processing circuit based on the time adjustment value.

15. The flow speed detection circuit of claim 14, wherein the control unit further estimates an estimated time difference between the first time point and the second time point, and determines the time adjustment value according to the estimated time difference and a reference time difference.

16. The flow speed detection circuit of claim 15, wherein the reference time difference is a signal transmission time between the first transducer and the second transducer under a known operation environment.

17. A chip, comprising:
   a flow speed detection circuit, coupled to a first transducer and a second transducer that are external to the flow speed detection circuit, wherein a distance between the first transducer and the second transducer is greater than zero, and a fluid having a flow speed sequentially flows past the first transducer and the second transducer, wherein the flow speed detection circuit comprises:
      a transmitter, coupled to the first transducer, and configured to provide a front signal and a main signal to the first transducer, wherein the first transducer transforms the front signal and the main signal into a transduced signal to the second transducer, and the second transducer transforms the transduced signal into a receiving front signal and a receiving main signal to a receiver; and
      the receiver, coupled to the second transducer, wherein the receiver comprises:
         a front signal detection circuit, configured to enable a main signal processing circuit after receiving the receiving front signal; and the main signal processing circuit, configured to determine the flow speed based on the receiving main signal after being enabled.

18. A flow meter, comprising:
the chip of claim 17; and
the first transducer; and
the second transducer.

\* \* \* \* \*